Sept. 22, 1925.                                            1,554,822
W. T. JAMES
DRIVING SYSTEM FOR AUTOMOBILE TRAINS
Filed May 27, 1918          3 Sheets-Sheet 1
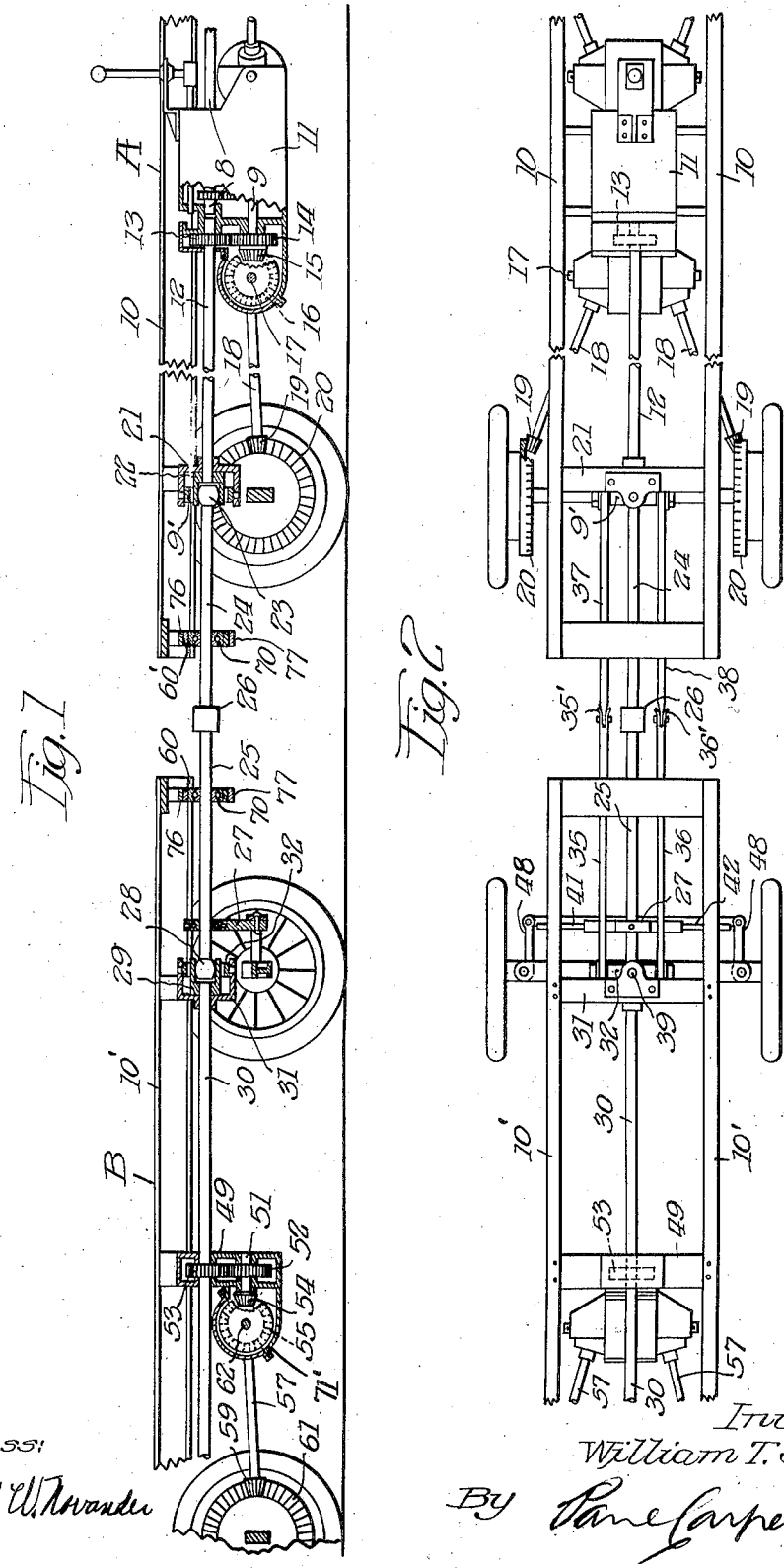

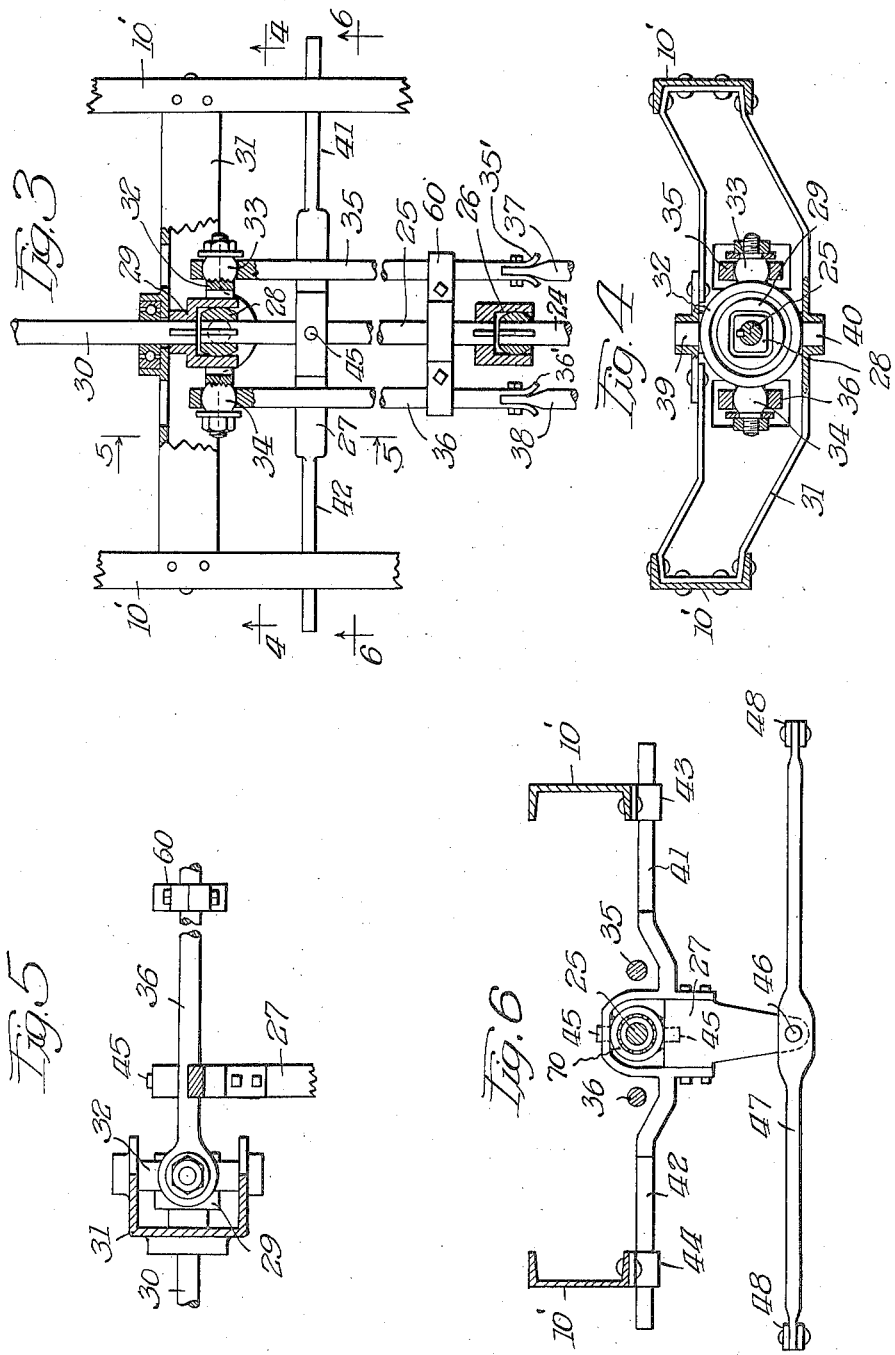

Sept. 22, 1925.
W. T. JAMES
1,554,822
DRIVING SYSTEM FOR AUTOMOBILE TRAINS
Filed May 27, 1918    3 Sheets-Sheet 3
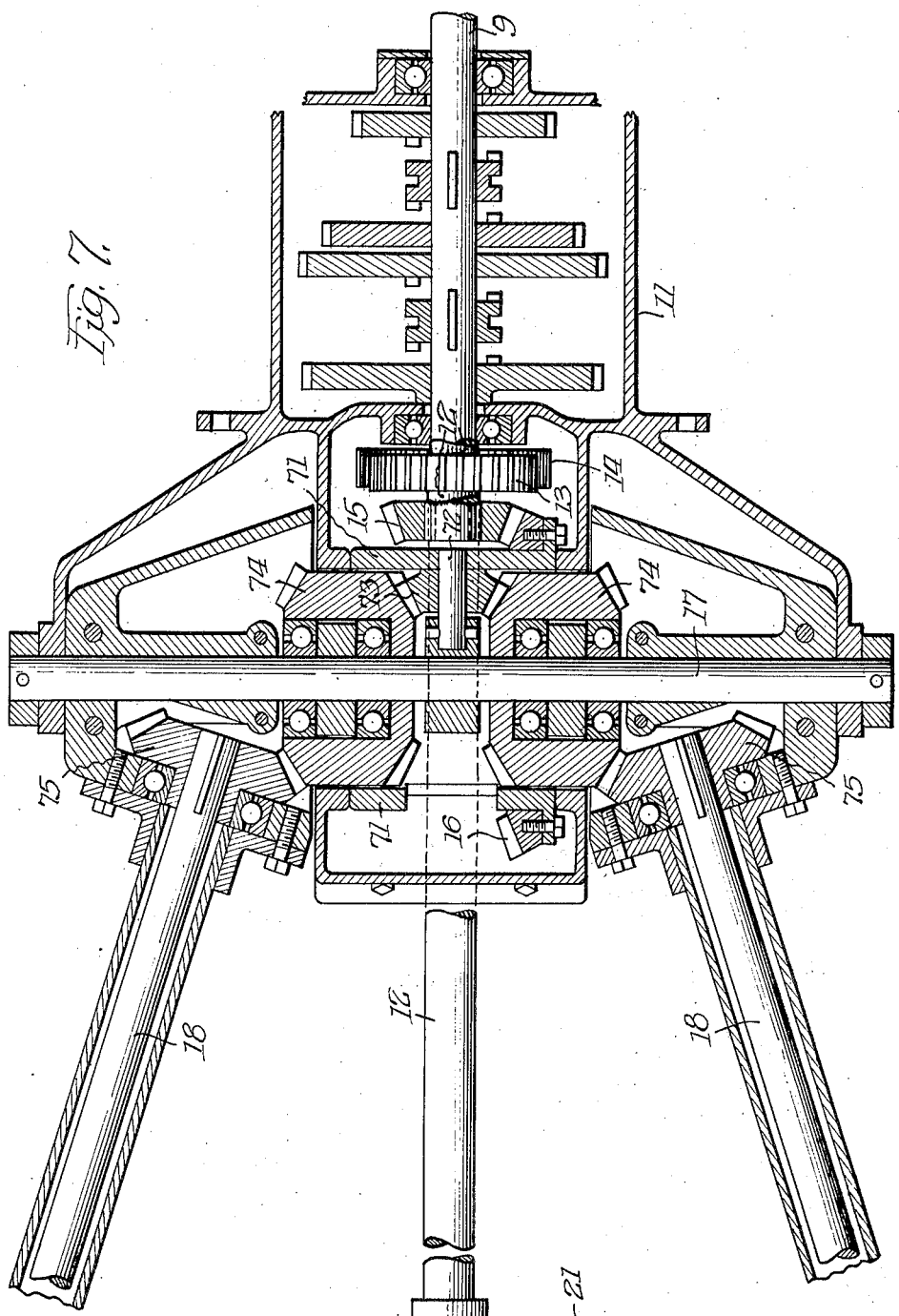
Fig. 7.
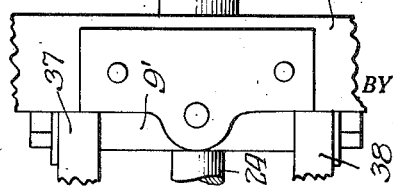
WITNESS
Leonard W. Novander
INVENTOR.
William T. James
BY
Payne Carpenter
ATTORNEY Patented Sept. 22, 1925.

1,554,822

UNITED STATES PATENT OFFICE.

WILLIAM THOMAS JAMES, OF CHICAGO, ILLINOIS.

DRIVING SYSTEM FOR AUTOMOBILE TRAINS.

Application filed May 27, 1918. Serial No. 236,763.

*To all whom it may concern:*

Be it known that I, WILLIAM THOMAS JAMES, a citizen of the United States, and a resident of the city of Chicago, in the State of Illinois, have invented certain new and useful Improvements in Driving Systems for Automobile Trains, of which the following is a specification.

My present invention relates in general to automotive vehicles and more particularly to trains of vehicles driven by a single prime mover, and has special reference to the provision broadly of a multiple drive acting directly upon a plurality of units in a train, and more specifically to the provision of an improved system for driving a number of attached train units in substantial unison.

The principal objects of the present invention are to convey power from a vehicle provided with motor to another vehicle having no motor or self-contained power and drive the second vehicle at the same speed as the prime mover; to provide means for positively varying the speed of several vehicles with exact synchronization; the provision for extending the application of power to additional vehicles, usually designated as trailers, forming a train of vehicles to all of which power is applied from the same source with central speed control; the provision of coupling connections between the several vehicles for transmitting draft strains, independently of the power transmitting mechanism; the provision of universally movable couplings, self-contained, one within another, and mounted so as to permit the power driven vehicles to travel around horizontal curves and over vertical curves without undue friction, or undue strain in the transmission mechanism; the provision of steering mechanism adapted to direct the travel of each vehicle in the same general direction as the vehicle or vehicles connected thereto; the provision of improved power transmitting mechanism and draft members so constructed and arranged that in making the connections between the vehicles such connections can be made in a single operation so as to facilitate and expedite the coupling and uncoupling operations and attain their accomplishments with the minimum of effort and inconvenience; the provision of a continuous drive shaft for delivering power from a prime mover to the wheels of a trailer; the provision of an improved form of speed changing gearing; the provision of an improved form of steering mechanism; the provision of an improved arrangement of draft elements for trains; the provision of an improved form of ultimate drive for the delivery of power to vehicle traction wheels, together with further objects as may be hereinafter disclosed.

In gaining the foregoing objects and certain additional benefits and advantages to be below pointed out, I have provided a construction, one embodiment whereof is illustrated in the accompanying drawings, wherein—

Figure 1 is a longitudinal view, partly in vertical section showing a side elevation of adjacent ends of two coupled motor vehicles, illustrating the power transmission mechanism and draft members extending to the drive mechanism in a non-motor vehicle from a motor vehicle which carries the prime mover;

Figure 2 is a plan view of certain of the elements of Figure 1, showing the transmission mechanism, draft elements and the coupling devices utilized in making the separable connections between the several power transmission and draft elements;

Figure 3 is an enlarged plan view, partly in horizontal section, showing the universal joints in the power transmission mechanism and the flexible joint in the propelling mechanism all connecting in the same center line;

Figure 4 is a vertical sectional elevation, taken on the line 4—4, and on certain couplings illustrated in Figure 3;

Figure 5 is a fragmentary side elevation of the flexible connection and relations between part of steering device and parts of the driving and draft members;

Figure 6 is an end elevation, partly in vertical section illustrative of the steering mechanism; and Fig. 7 is a sectional plan view of the transmission mechanism of the prime mover, showing the driving connections and draft elements at the source of power.

Referring first more particularly to Figures 1 and 2 of the drawings, it will be noted that I have here indicated the primary drive shaft 8 from the motor or prime mover, (which may be conveniently an internal combustion engine) of the leading vehicle A. This shaft extends into the change speed transmission gears, contained in the housing 11, by means of which the driven shaft 9 of the vehicle A carrying the motor is operated. The transmission gear housing 11 is conveniently mounted between the side bars of the motor vehicle frames, indicated at 10. The power transmission shaft 12 of the "leader" or motor carrying vehicle is driven adjacent one end by a gear 13 from a gear 14 which is keyed on the shaft 9 as is the gear 15, as will appear from Figure 1. This gear 15 meshes with a gear 16 in the differential 71 having a differential gear 73 meshing into gears 74—74 on the jack shaft 17. The gears 74 in turn mesh with the gears 75 on the ultimate drive shafts 18—18. The shafts 18—18 are provided with pinions 19—19 which drive gears 20—20 carried on the wheels of the power or motor truck. (See Figure 1.) For supporting the other drive shaft 12 and the flexible connections 9' (see Figure 2) surrounding the universally movable couplings 23, presently to be described, a cross member 21 is rigidly fixed between the side bars 10. A shaft 24 extends from the universal coupling joint 23 through a supporting device 60' to the universal coupling 26.

In the "trailer" B a drive shaft 25 extends from the coupling 26 through the supporting deivce 60 to the universal coupling joint members 28—29 (see Figures 3 and 5). A shaft 30, which is a continuation of the drive shaft 25 extends from the coupling member 29 through the rigid cross member 49, supported by the side frame-members 10'. A gear 53 is keyed on the shaft 30 for operating a gear 52 mounted on the shaft 51, which carries a pinion 54 for driving the gear 55 on the shaft 62 in the differential 71', which is constructed substantially as shown in Figure 7, and provided with similar gearing for driving the ultimate shafts 57—57 provided with pinions 59—59 for driving the gear 61 on the wheels of the "trailer", whereby the vehicles A and B may be positively driven in unison and their speed varies from time to time in substantial synchronization, and without back-lash.

A rigid cross-member 31 is supported by the vehicle frame side bars 10' of the trailer B and is provided with housing bearings for the vertical trunnion extensions 39 and 40 (see Figure 4) formed on the flexible coupling 32 (see Figures 2 and 5) of the "trailer", the construction being similar to that indicated at 9' in the prime mover.

As will be seen on examination of Figure 4, horizontal trunnion projections 33—34 are provided for connecting to the "trailer" the draw bars 35—36 to which are attached draw bars 37—38 on the adjoining vehicle, the members 35—37 and 36—38 being provided with means for attaining vertical flexibility as indicated at 35'—36", that is in the same transverse center line as the axis of the joint 26, the members 35—36 are bifurcated and flared open at the ends as indicated at 35'—36' to facilitate connecting the members 35—36 and 37—38, by suitable coupling pins.

For causing each trailer to follow the path of the leading vehicle and so track conformably therewith, thus insuring the safe passing of obstacles and avoiding the necessity of making curves of long radii in turning corners, moving to one side of the road and the like, a steering cross beam comprising members 41—42, supported by bearings 43—44 (see Figure 6) carried by the side bars 10 and provided with a ball bearing 70 trunnioned as indicated at 45 is suspended from the shaft 25 by means of an arm 27 connected to the shifting beam 47 by a bolt 46 for steering the vehicle through the arms 48 (see Figure 2). Spacing members 60 (see Figure 5) are bolted on both sides of the elements 35—25—36 to retain the several members in their predetermined realtive positions and are supported in operative position by an upper bar 76, and a lower bar 77, which form guides rigidly fixed at their ends to the side bars 10, and sustain a ball bearing 70 for the shaft 25, thus the bars 76—77 serve also as guides between which the spacing member 60 slides horizontally when the vehicle turns in a generally horizontally curved line.

From the foregoing description of the construction, relation and operation of the several parts carried by the prime mover and of the cooperating analagous parts carried by such number of "trailers" as may be used in forming the train, it will be apparent that I have provided a construction wherein a continuous driving shaft is employed, which extends from the motor of the prime mover even to the transmission mechanism of the last trailer, and that consequently all of the several vehicles are driven in unison. Further, that provision is made in the connection between the several units of the train whereby accommodation is afforded for vertical inequalities in the road surface, not only in the draft members but also in the drive shaft, and that similar provision is also made, not only for permitting the flexibility between the several units of the train but also for accomplishing such flexibility without putting any undue strain upon the driving mechanism in turning corners or moving to one side of the road. Also that the steering gear is so constructed and arranged as to cause the first trailer to track in substantial accordance with the path of the prime mover and each subsequent trailer to track substantially the same as the one ahead of it. In short, the entire train in the three respects of driving, draft, and steering, is so synchronized as to insure cooperative unisonal and sequential actions of the elements in such a manner that the train, as a whole, and all parts of it move simultaneously at a speed and over a course determined by the driver of the prime mover.

Having thus described my invention and illustrated its use, what I claim as new and desire to secure by Letters Patent is:

1. An automotive vehicle train comprising, in combination, a plurality of vehicles, one of which is provided with a prime mover, independent driving mechanism on at least two of said vehicles, and a common driving shaft connected to the driving ends of said two several driving mechanisms from said prime mover, the said driving shaft being provided with a flexible joint adapted to permit relative lateral movement of said vehicles, and the said joint being arranged immediately above the traction plane of the wheels of one of the vehicles.

2. An automotive vehicle train comprising, in combination, a plurality of vehicles, one of which is provided with a motor, independent driving mechanisms on at least two of said vehicles, and a common driving shaft connected to the driving ends of said two several driving mechanisms from said motor, the said driving shaft being provided with flexible joints adapted to permit relative lateral movement of said vehicles, and the said joints being arranged immediately above the traction planes of the wheels of the vehicles.

3. An automotive vehicle train comprising, in combination, a plurality of vehicles, one of which carries a motor, a driving mechanism on another of said vehicles, mechanism for steering the trailing vehicle by the leading vehicle, and a driving shaft for driving said driving mechanism lying in substantially the same horizontal plane as said steering mechanism.

4. An automotive vehicle train comprising, in combination, a plurality of vehicles, driving mechanism on at least two of said vehicles, draft mechanism connecting said vehicles, and means for driving said two several driving mechanisms at substantially the same rate of speed independently of said draft mechanism said driving means and draft mechanism being substantially in the same horizontal plane.

5. A vehicle train, comprising, in combination, a leading vehicle, a trailing vehicle, provided with steering mechanism, a driving shaft between the vehicles, a pair of draw-bars connecting said leading and trailing vehicles, arranged in substantially the same plane as said driving shaft, a suitable connection between said draft mechanism and the steering mechanism of the trailing vehicle for actuating said steering mechanism when the leading vehicle moves laterally relatively to the trailing vehicle, and means for accommodating vertical movement between the said vehicles without actuation of said steering mechanism.

6. A vehicle train, comprising, in combination, a leading vehicle, a trailing vehicle, provided with steering mechanism, a plurality of draw-bars connecting a leading and a trailing vehicle, and suitable connection between said draw-bars and said steering mechanism of the trailing vehicle for actuating said steering mechanism when the leading vehicle moves laterally relatively to the trailing vehicle, the said draw-bars being jointed for accommodating vertical movement between said vehicles without actuation of said steering mechanism.

7. An automotive vehicle train comprising, in combination, a plurality of vehicles, one of which carries a motor, a driving mechanism on another of said vehicles, a drive shaft for driving said driving mechanism from said motor, steering mechanism on a trailing vehicle operable by the lateral movement of a leading vehicle, and draft mechanism between a leading and a trailing vehicle, said draft mechanism including a pair of draw-bars, one on each side of the drive shaft, and being arranged to actuate said steering mechanism.

8. An automotive vehicle train comprising, in combination, a plurality of vehicles, one of which carries a motor, a driving mechanism on another of said vehicles, a jointed drive shaft for driving said driving mechanism from said motor, steering mechanism on a trailing vehicle operable by the lateral movement of a leading vehicle, and independent jointed draft mechanism between a leading and a trailing vehicle, the joints in the draft shaft and the draft mechanism being arranged in substantially a common transverse axis, whereby relative vertical movement of the two vehicles is accommodated without strain, and without actuation of the steering mechanism.

9. An automotive vehicle train comprising, in combination, a plurality of vehicles, driving mechanism for said plurality of vehicles, a driving shaft acting positively on each of said driving mechanism for driving said vehicles in unison, steering means for each of said vehicles, a driving shaft, and means for operating said steering means successively by means of the leading vehicles by lateral displacement of but independently of rotatory movement of the driving shaft, said driving shaft and operating means being arranged to permit universal angular relation of the several vehicles.

10. An automotive vehicle train comprising, in combination, a plurality of vehicles, driving mechanism and steering mechanism for each of said vehicles, a driving shaft for operating each of said driving mechanisms in unison and extending the length of the train, connecting driving members between each of the vehicles and forming parts of said driving shaft, and means connecting said connecting driving members to the vehicle steering mechanisms for operating the latter independently of rotary movement of the connecting driving members.

In testimony whereof, I have hereunto signed my name.

WILLIAM THOMAS JAMES.